May 13, 1958     J. J. BOOTH     2,834,511
CUP DISPENSER FOR BEVERAGE VENDING MACHINES
Filed Dec. 15, 1954
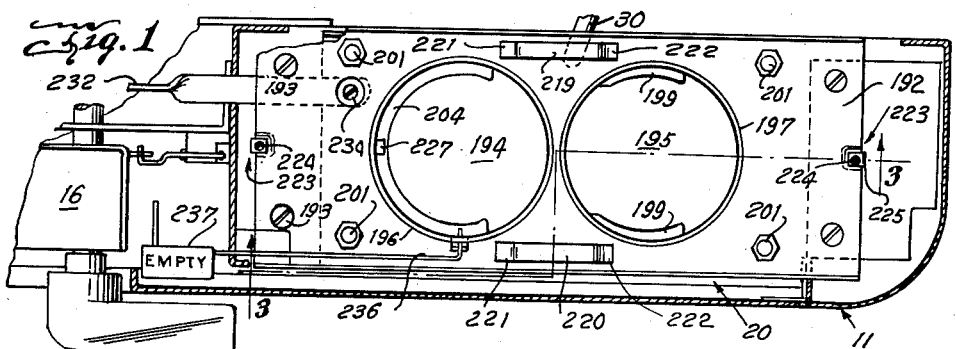
Jack J. Booth
INVENTOR.
BY
ATTORNEY

United States Patent Office 2,834,511
Patented May 13, 1958

2,834,511

CUP DISPENSER FOR BEVERAGE VENDING MACHINES

Jack J. Booth, Dallas, Tex.

Application December 15, 1954, Serial No. 475,395

7 Claims. (Cl. 221—116)

This invention relates to drink vending machines and more particularly to a cup dispensing mechanism for beverage vending machines.

This application is a continuation-in-part of my co-pending application Serial Number 230,779, filed on the 9th day of June 1951, now Patent No. 2,747,782.

It is an object of the invention to provide a new and improved dispensing device for dispensing cups alternately from two columns of stacked cups.

It is a still further object of this invention to provide a new and improved means for dispensing the lowermost cup from a vertical stacked column of cups.

It is yet another object of this invention to provide a new and improved means for dispensing the lowermost cup from a vertical stacked column of cups with a positive downward thrust.

It is a still further object of this invention to provide a new and improved mechanical means for dispensing a cup from a vertical stack of cups and delivering a predetermined quantity of a drink into the dispensed cup by the actuation of a single lever.

Yet another object of the invention is to provide spring means to prevent tilting of each cup as it is released from a stack of cups to assume its position for filling.

The operating lever of the device is mechanically connected to the cup dispensing means of the machine of the present invention to dispense a cup alternately from two vertical stacks of cups to place the dispensed cup below the outlet nozzle connected to the outlet of the mixing and dispensing valve. The cup dispensing means includes a stationary plate provided with a pair of apertures through which the lowermost cups of the two stacks are allowed to drop alternately each time a slide mounted on the stationary plate is moved by the operating lever. Springs mounted on the slide plate are employed to force the lowermost cup downward to insure that the lowermost cup will drop even if it tends to adhere or stick to the next cup nested in it.

For a better understanding of the invention, reference may be had to the following description taken in connection with the accompanying drawing and its scope will be pointed out in the appended claims.

In the drawing:

Figure 1 is a top plan view of the cup dispensing mechanism;

Figure 2 is a bottom plan view of the mechanism shown in Figure 1;

Figure 3 is a partly sectional view taken on the line 3—3 of Figure 1 and showing the cup positioning chute positioned beneath the cup dispensing mechanism;

Figure 4 is a sectional view taken on the line 4—4 of Figure 2; and

Figure 5 is a sectional view taken on the line 5—5 of Figure 3.

The cup dispensing mechanism 20 includes a top stationary plate 192 which is mounted in a horizontal position on stationary structural members of the door 11 by screws 193. The stationary plate 192 is provided with a pair of circular apertures 194 and 195 into which extend the open cylinders 196 and 197 rigidly mounted on the stationary plate in any conventional manner. Each of the cylinders 196 and 197 is adapted to hold a stack of nested cups. Both the apertures 194 and 195 and the cylinders are of such diameter that the cups would fall through the apertures 194 and 195 if they were not supported by a slidable plate 200. The slidable plate has pairs of opposed side lips 198 and 199, respectively, and is mounted on the stationary plate 192 by means of bolts 201 which extend through circular apertures in the stationary plate and through elongated slots 202 in the slidable plate. Tubular spacers 203 on the bolts maintain the two plates in properly spaced relationship.

The slidable plate has a large substantially oblong aperture whose opposite edges 204 and 205 are substantially circular in shape and are so spaced apart that when the slidable plate 200 is in one extreme position the end edge 204 will extend beneath the aperture 194 but the other edge 205 will not be disposed beneath the aperture 195 so that all the cups in the cylinder 197 would fall through the plates were it not for the pair of side lips 199 which extend beneath the aperture 195. When the slidable plate is in its opposite extreme position the end edge 205 will extend beneath the aperture 195 and the pair of side lips 198 will extend beneath the aperture 194.

As is shown in Figures 2, 3 and 4, the side lips 198 and 199 are formed by bending appropriately shaped portions of the slidable plate 200 upwardly to form vertical members 206 and 207 and then again bending the portions intermediate their ends to form the horizontal side lips 198 and 199 so that the side lips are extended in a plane parallel to and above the plane in which the end edges 204—205 lie.

If stacks of nested cups 208 provided with outwardly extending lips 209 are in the cylinders 196 and 197, the stack of cups in the cylinder 196, Figures 1 and 5, is supported on the end edge 204 which underlies the lip 209 of the lowermost cup in the cylinder 196. The stack of cups in the cylinder 197 on the other hand is supported on the side lips 199 which underlie the lip 209 of the lowermost cup in the cylinder 197. If the bottom slide 200 is now moved to the left, Figures 1–3, the side lips 198 will move beneath the second lowest cup of the stack of cups in the cylinder 196, while the end edge 204 will move from beneath the lip 209 of the lowermost cup which will then be free to drop by gravity to the chute 210 which will guide its downward movement to cause it to fall upright on the platform 22 beneath the nozzle 30. At the same time the side lips 199 have moved from beneath the lowermost cup of the stack of cups in cylinder 195 but their fall is arrested by the end edge 205 which has moved beneath the lip of the lowermost cup. Simultaneously with this operation, the stack of cups in cylinder 196 will again be supported by the end edge 204 which moves beneath the lip of the lowermost cup as the side lips move from beneath it. In this manner cups are dispensed alternately from the stacks of cups in the cylinders 194 and 195.

It is found that the cups are sometimes firmly wedged together or are glued together by waxy substances with which the cups are sometimes coated so that the force of gravity is insufficient to cause the cup to drop even though the end edge 204 or 205 no longer supports it. It is necessary, therefore, to provide some means which will give a downward push to the lowermost cup when the end edge 204 or 205 moves out from beneath it. It is also desirable to accelerate the descent of the cup to cause it to reach its receiving position quickly to make certain the cup is in position before the drink begins to pour from the nozzle 30.

A pair of springs 211 and 212 are disposed on opposite sides of the slidable plate 200 and are secured intermediate their ends by screws 213 to inwardly extending lugs 214 which are integral with the bottom plate. Each of the springs has an end 215 which underlies its adjacent side lip 198 and an end 216 which underlies its adjacent side lip 199. The portions 217 and 218 of the springs lying between the center portion of the spring secured to the lug 214 and the ends 215 and 216, respectively, are bent upwardly to contact raised elongated cams 219 and 220 which are formed by portions struck upwardly from opposite sides of the stationary plate 192. The cams 219 and 220 allow the ends 215 of the springs to lie closely adjacent their associated side lips 198 when the slidable plate is in its extreme right hand position, Figures 1 to 4. When the slidable plate is moved to the left, the ends 215 remain close to the side lips 198 until the intermediate portion 217 encounters the sloping portions 221 of the cams 219 and 220. At this point the end edge 204 has moved from beneath the lowermost cup in cylinder 196. Further movement to the left will cause the ends 215 of the springs to move quickly downward thrusting the lowermost cup into the chute 210. During this movement of the bottom plate, the portions 218 of the springs have moved past the sloping portions 222 to the central raised portion of the cams so that the ends 216 will now closely underlie the side lips 199. Movement of the slidable plate 200 to the right will now similarly cause the ends 216 to give a downward thrust to the lowermost cup in the cylinder 197. The springs, therefore, insure that a positive mechanical force will be applied to the lowermost cup to cause it to move quickly into the chute 210.

In order to prevent tilting of the cups as they are droped by the side lips 198 and 199, a leaf spring 223 is secured at one end to each end of the stationary plate 192 by means of screws 224. The spring is formed into a loop 225 which extends downwardly thence upwardly below the end of the slidable plate 200 and is turned into a plane normal with the two plates 192 and 200 and extends between them. The opposite end of the spring 223 is bent upwardly, forwardly and downwardly to form a stop 226 which engages the lower edge of a cup cylinder which extends below the stationary plate 192. The extremity 227 of the spring protrudes underneath the edge of the cup cylinder and holds the cup dropped by the lips 198 or 199 against tilting as the cup is dropped down to the next level. The end 227 of the spring is moved out of the way by engagement of the end of the slidable plate 200 just before the latter reaches the limit of its travel.

The cylinder 196 is provided with a slot 235 through which extends the end of a feeler lever 236 which, when the cylinder 196 is empty, pivots into the cylinder. The feeler lever is connected through conventional means to the conventional coin operated mechanism 16 and prevents operation of the operating shaft whenever no cups are present in the cylinder. It may also be provided with a sign 237 which is moved before an aperture 238 in the panel 13 to indicate that the machine is empty and that a drink will not be vended if a coin is deposited in the slot of the coin operated mechanism 16.

It will be apparent to those skilled in the art that various changes and modifications can be made in the described and illustrated machine without departing from the invention and it is intended therefore, in the appended claims to cover all such changes and modifications as fall within the true spirit and scope of the invention.

What is claimed is:

1. A cup dispensing means comprising a stationary plate having an opening, a cylinder mounted on said plate and disposed about said opening for receiving a stack of nested cups having outwardly extending lips at their upper edges; a slidable plate mounted for limited reciprocable movement on said stationary plate, said slidable plate having an end edge adapted to be disposed beneath the lip of the lowermost cup of the stack and a pair of opposed side lips disposed in a plane above and parallel to the plane in which said end edge is disposed, said side lips moving below the lip of the second lowermost cup in the stack as said slidable plate is moved toward one extreme position to withdraw the end edge from beneath the lip of the lowermost cup, whereby said lowermost cup will fall from the stack, said end edge moving beneath the lip of the next lowermost cup as the slidable plate is moved toward the other extreme position to withdraw the side lips from beneath the lip of the cup resting on said side lips and flexible means carried by said stationary plate and extending into an adjacent opening of said stationary plate to hold a cup against tilting as the cup is dropped through said opening, said flexible means having a portion disposed in the path of said slidable plate for engagement thereby to withdraw said flexible means from said adjacent opening.

2. A cup dispensing means comprising a stationary plate having an opening; a cylinder mounted on said plate and disposed about said opening for receiving a stack of nested cups having outwardly extending lips at their upper edges; a slidable plate mounted for limited reciprocable movement on said stationary plate, said slidable plate having an end edge adapted to be disposed beneath the lip of the lowermost cup of the stack and a pair of opposed side lips disposed in a plane above and parallel to the plane in which said end edge is disposed, said side lips moving below the lip of the second lowermost cup in the stack as said slidable plate is moved toward one extreme position to withdraw the end edge from beneath the lip of the lowermost cup, whereby said lowermost cup will fall from the stack, said end edge moving beneath the lip of the next lowermost cup as the slidable plate is moved toward the other extreme position to withdraw the side lips from beneath the lip of the cup resting on said side lips; and means mounted beneath each side lip and movable downwardly from each side lip for exerting a positive downward force on the lip of the lowermost cup as side lips move beneath the lip of the second lowermost cup and flexible means carried by said stationary plate and extending into an adjacent opening of said stationary plate to hold a cup against tilting as the cup is dropped through said opening, said flexible means having a portion disposed in the path of said slidable plate for engagement thereby to withdraw said flexible means from said adjacent opening.

3. A cup dispensing means comprising a stationary plate having a pair of openings; a pair of cylinders mounted on said plate and disposed about said opening, each of said cylinders being adapted to receive a stack of nested cups having outwardly extending lips at their upper edges; a slidable plate mounted on said stationary plate for limited reciprocable movement to opposite extreme positions beneath said stationary plate, said slidable plate having a large aperture, said slidable plate having inner end edges defining opposite ends of said large aperture, one of said end edges being adapted to be disposed beneath the lip of the lowermost cup of one stack while the other of said end edges being adapted to be disposed beneath the lip of the lowermost cup of the other stack, only one of said end edges being disposed beneath the lip of a lowermost cup of a stack when the slidable plate is in either of its extreme positions; and two pairs of opposed side lips on said slidable plate project into said large aperture, said side lips being disposed in a plane above and parallel to the plane in which said end edges are disposed, one pair of side lips moving beneath the lip of the second lowermost cup of one stack as the associated end edge withdraws from beneath the lip of the lowermost cup in said one stack while the other pair of side lips withdraws from beneath the lip of a lowermost cup in the other stack as the associated end edge moves beneath the lip of the lowermost cup in said other stack.

4. A cup dispensing means comprising a stationary plate having a pair of openings; a pair of cylinders mounted on said plate and disposed about said opening, each of said cylinders being adapted to receive a stack of nested cups having outwardly extending lips at their upper edges; a slidable plate mounted on said stationary plate for limited reciprocable movement to opposite extreme positions beneath said stationary plate said slidable plate having a large aperture, said slidable plate having inner end edges defining opposite ends of said large aperture, one of said end edges being adapted to be disposed beneath the lip of the lowermost cup of one stack while the other of said end edges being adapted to be disposed beneath the lip of the lowermost cup of the other stack, only one of said end edges being disposed beneath the lip of a lowermost cup of a stack when the slidable plate is in either of its extreme positions; two pairs of opposed side lips on said slidable plate project into said large aperture, said side lips being disposed in a plane above and parallel to the plane in which said end edges are disposed, one pair of side lips moving beneath the lip of the second lowermost cup of one stack as the associated end edge withdraws from beneath the lip of the lowermost cup in said one stack while the other pair of said lips withdraws from beneath the lip of a lowermost cup in the other stack as the associated end edge moves beneath the lip of the lowermost cup in said other stack; and means mounted beneath each side lip and movable downwardly from each side lip for exerting a positive downward force on the lip of the lowermost cup as side lips move beneath the lip of the second lowermost cup.

5. In the device of claim 2, said last means comprising a spring adjacent each side lip, said springs being mounted on said slidable member, each of said springs having a free end beneath its associated side lip and an intermediate portion; and cam surfaces on said stationary plate engaged by said intermediate portions of said springs for moving said free ends downwardly as said slidable plate is moved with respect to said stationary plate.

6. In the device of claim 4, said last means comprising a spring adjacent each side lip, said springs being mounted on said slidable member, each of said springs having a free end beneath its associated side lip and an intermediate portion; and cam surfaces on said stationary plate engaged by said intermediate portions of said springs for moving said free ends downwardly as said slidable plate is moved with respect to said stationary plate.

7. A cup dispensing means comprising a stationary plate having a pair of openings through which cups may pass; a slidable plate reciprocably mounted on said stationary plate for dispensing cups alternately through said openings, a leaf spring at each end of said stationary plate, said leaf springs each having an end secured to an end of said stationary plate and formed into a loop lying in the path of said slidable plate, the opposite end of said spring extending past the edge of an adjacent opening to hold a cup against tilting as the cup is dropped through said opening, said loop being engaged by said slidable plate to withdraw the extended end of said spring from said opening.

References Cited in the file of this patent
UNITED STATES PATENTS

| | | |
|---|---|---|
| 1,260,432 | Nias | Mar. 26, 1918 |
| 1,261,950 | Luellen | Apr. 9, 1918 |
| 1,311,170 | Lockwood | July 29, 1919 |
| 1,666,008 | Graffenberger | Apr. 10, 1928 |
| 2,233,690 | Williamson | Mar. 4, 1941 |
| 2,669,498 | Bremer | Feb. 16, 1954 |